United States Patent [19]

Perry

[11] 4,128,013

[45] Dec. 5, 1978

[54] PRESSURE TRANSDUCER

[76] Inventor: Joseph A. Perry, 1815 Eleanor Ave., St. Paul, Minn. 55116

[21] Appl. No.: 813,932

[22] Filed: Jul. 8, 1977

[51] Int. Cl.$^2$ .............................................. G01L 7/08
[52] U.S. Cl. ........................................ 73/701; 73/715
[58] Field of Search ................. 73/388 BR, 406, 408, 73/395, 701, 715; 137/85

[56] References Cited

U.S. PATENT DOCUMENTS

| | | | |
|---|---|---|---|
| 1,924,781 | 8/1933 | Gaiser | 73/715 |
| 3,161,051 | 12/1964 | Perry, Jr. | 73/299 |
| 3,563,094 | 2/1971 | Rieschel | 73/388 BR |
| 3,845,664 | 11/1974 | Perry, Jr. | 73/388 BR |

*Primary Examiner*—Donald O. Woodiel
*Attorney, Agent, or Firm*—Schroeder, Siegfried, Ryan, Vidas & Steffey

[57] ABSTRACT

This invention relates to a pressure transducer adapted to transduce or convert fluid pressure into air pressure on a one-to-one basis for control or indication purposes. The transducer includes a diaphragm held between two sealing members and clamped by a transducer body against a mounting member to permit flexing of the diaphragm in either direction such as to be capable of operation in either atmospheric or vacuum environments. An adjustable nozzle in the transducer body permits adjustment of a vent passage in the transducer body relative to the diaphragm to insure a one-to-one conversion of fluid pressure to control pressure.

8 Claims, 7 Drawing Figures

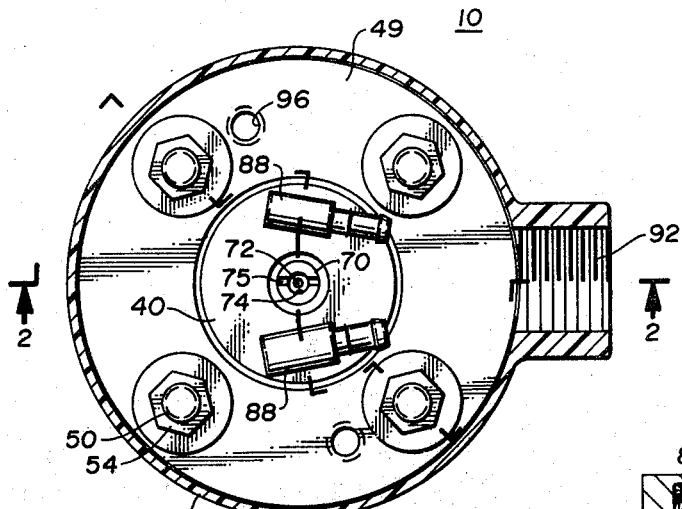
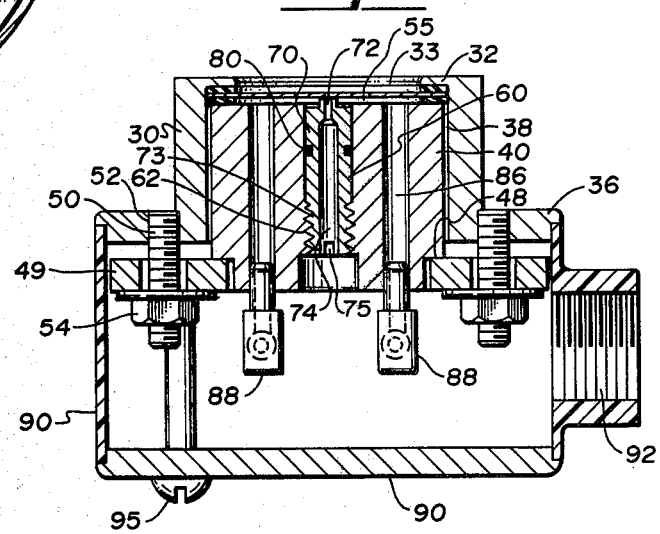
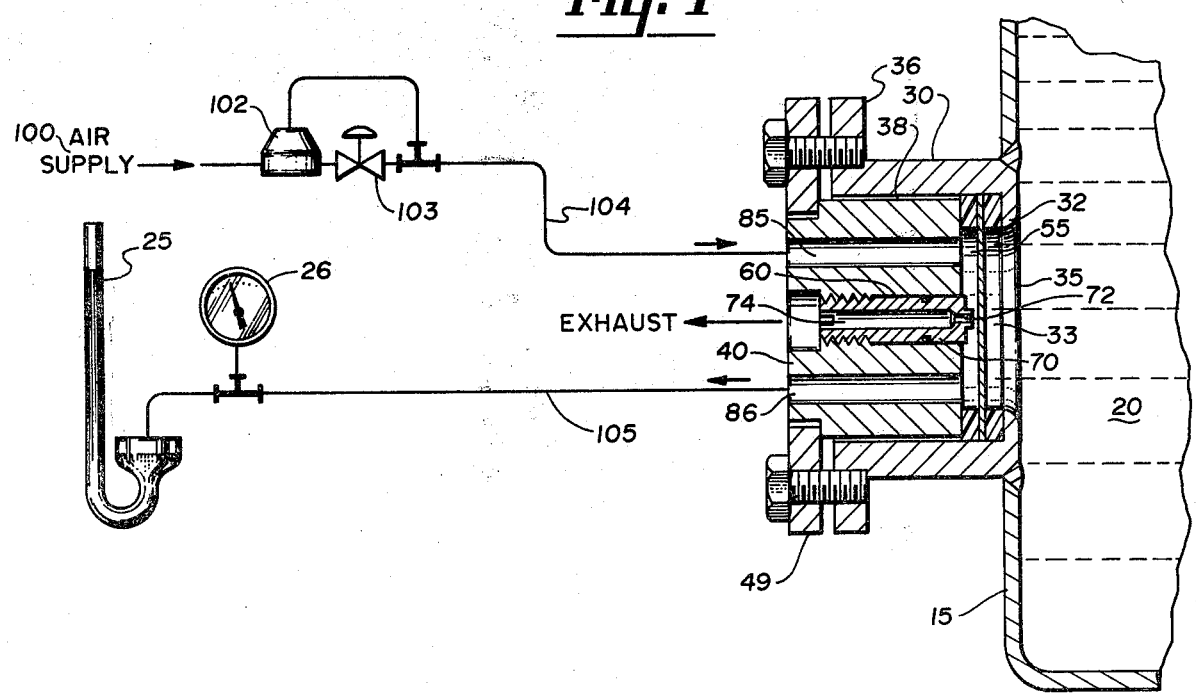

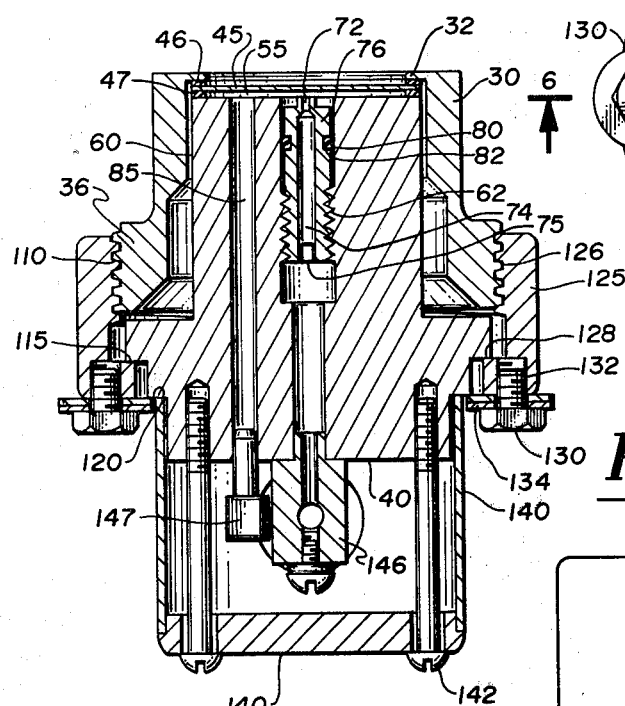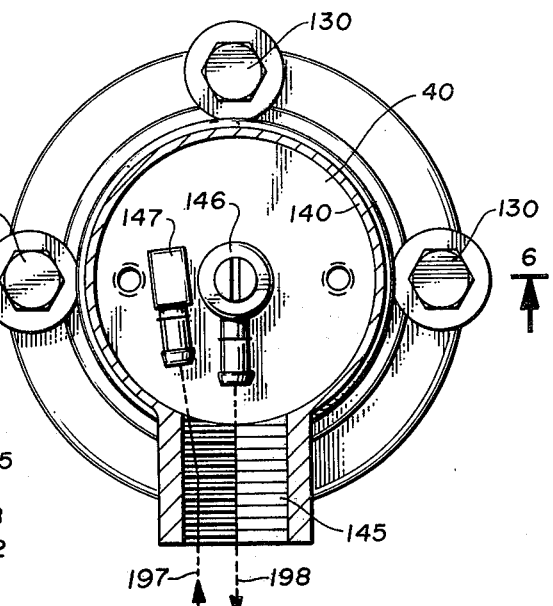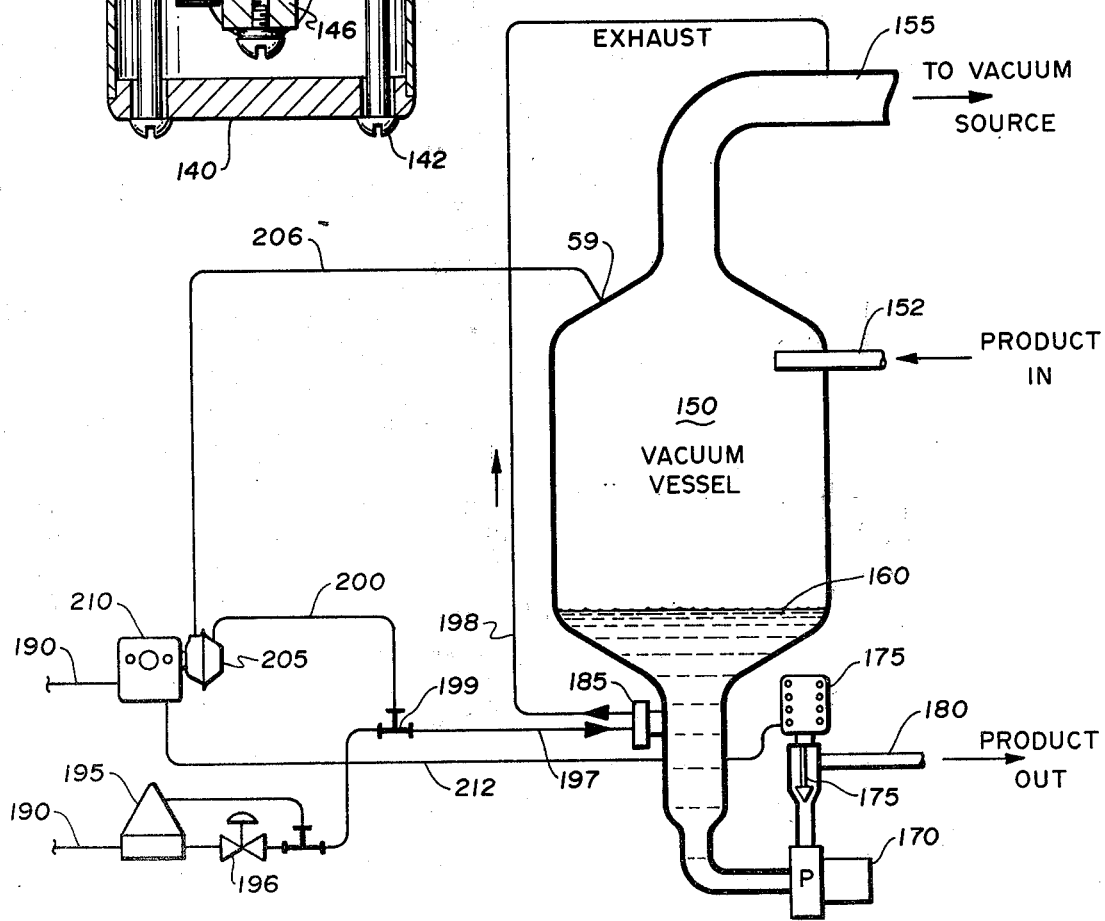

PRESSURE TRANSDUCER

FIELD AND BACKGROUND OF INVENTION

This invention relates to a pressure transducer for converting a fluid pressure to a controlled air pressure on a one-to-one basis from a container or pipe having the fluid therein without permitting any of the fluid to leave the container or pipe.

Pressure sensing transducers and controllers are well recognized in the art. Where such transducers are utilized for indicating or controlling pressure within a pipe or container, the problem exists as to a mounting of the transducer in the container so as not to interfere with the contents therein and to adequately seal the same to prevent escape of liquid within the container into the controlling air supply. Similarly, a problem exists in constructing such a transducer to provide a direct relationship between sensed pressure and controlled pressure from the transducer without the use of internal springs, bearings, or levers, and to provide such a transducer that is capable of measurement over a wide range of pressures including negative (sub-atmospheric) pressures.

SUMMARY OF PRESENT INVENTION

The present invention is directed to a pressure transducer which will transduce or convert a fluid pressure into an air pressure on a one-to-one basis. That is, the air pressure will be substantially equal to the fluid pressure. This improved pressure transducer will measure fluid pressure in a tank or pipeline without permitting any of the fluid to leave the tank or pipeline. The application for such a transducer is in the measurement or control of level or pressure in a system or container where the fluid should not leave the container for various reasons. Examples of such conditions are in the measurements of pressures of food products which will deteriorate when exposed, flammable products which will cause a fire hazard, dirty products which will foul piping, heated products which will congeal or harden when exposed to atmosphere, refrigerated products which will vaporize or spoil if the temperature changes, corrosive products which will attack metal parts and any other types of fluid in which a measurement or processing problem are created when the fluid is removed from its pipe or container.

The improved pressure transducer of the present invention provides an arrangement in which the transducer body is mounted in a mounting member secured to an opening in the side of the container or conduit with a sensing diaphragm secured between sealing rings on either side of the same and positively clamped between the transducer body and the mounting member to insure a positive seal on both sides of the diaphragm. The transducer body includes an exhaust aperture having an exhaust nozzle positioned therein whose nozzle is adjustable relative to the diaphragm in the pressure chamber to accurately control the pressure response of the transducer over a wide range of pressures and provide for a one-to-one ratio between the fluid pressure sensed and pneumatic pressure output. The improved pressure transducer mounts the sensing diaphragm in such a manner that it is capable of displacement to either side of a reference point. Further the improved pressure transducer includes a mounting for a transducer body which may be readily removed for maintenance and is positively sealed within a mounting body so as to prevent escape of the fluid from within the container into the pneumatic transducer in common with the pneumatic control circuit. The improved transducer utilizes a flat diaphragm with a positive seal or clamping of the same in the mounting member which permits the application of reverse pressure thereto without damaging the diaphragm. The sealing or gasket configuration allows accidental leakage of the outside seal or gasket, if leakage occurs therein, to pass around the transducer to atmosphere without entering the pneumatic circuits. Similarly, leakage of the inner seal, if it exists, permits the control air to escape around the transducer body without entering the container. The adjustability of the transducer nozzle allows the diaphragm to operate in a neutral position which permits near perfect one-to-one pressure correspondence. The improved design is particularly applicable for sanitary measuring operations and may be utilized in positive pressure or vacuum systems.

DESCRIPTION OF THE DRAWINGS

FIG. 1 is a plan view of the improved pressure transducer with its cover in section;

FIG. 2 is a sectional view of the transducer of FIG. 1 taken along the line 2—2 therein;

FIG. 4 is a schematic piping diagram of a pressure indicating system for a tank having a liquid product therein showing an application for the improved pressure transducer;

FIG. 5 is a plan view of an alternate embodiment of the improved pressure transducer;

FIG. 6 is a sectional view of the transducer of FIG. 5 taken along the lines 6—6 therein; and FIG. 7 is a schematic piping diagram of a vacuum vessel control system showing an application of the embodiment of FIGS. 5 and 6.

Figure 3:
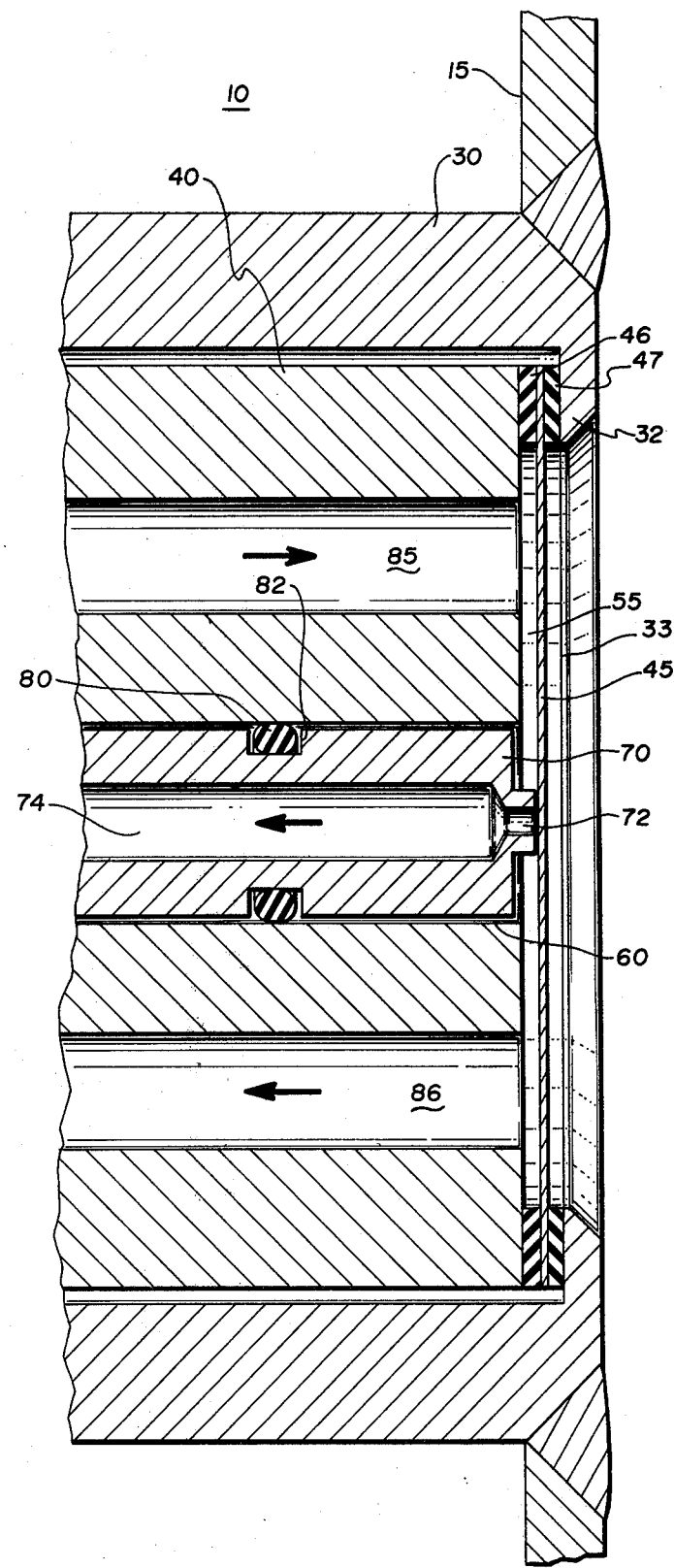
FIG. 3 is an enlarged sectional view of a portion of FIG. 2 with parts broken showing the mounting of the sensing diaphram and the adjustable nozzle of the transducer.

The improved and enlarged pressure transducer 10 is shown with parts broken away, in section A and enlarged in FIGS. 1, 2, and 3 to show the general shape and arrangement of parts of the same. The improved pressure transducer 10 is comprised of an outer shell or mounting member 30, the base or outer end of which is welded or suitably clamped to the wall of a pipe or a container 15 at an opening therein, indicated at 35. The mounting member or shell has a suitable inner flange section 32 with an opening 33 therein adapted to be positioned over the opening 35 in the pipe or container. The mounting member 30 has an outwardly extending flange section 36 at the other end of the same with the uniform bore 38 therebetween. Positioned within the uniform bore is the body 40 of the transducer. As will be best seen in FIG. 3, the pressure transducer utilizes a flat diaphragm 45 which is made of a material, such as stainless steel or a hardened plastic, such as Teflon. The diaphragm is held against the inner flange 32 of the mounting member between two gaskets or sealing members 46, 47 respectively, which are positioned along the rim of the diaphragm and on either side of the same. The gaskets may be made of any suitable sanitary gasket material. The transducer body 40 is positioned within the bore 38 of the mounting member and bears against the gasket 46 to clamp the gaskets and hence, the diaphragm within the mounting member. The opposite end of the transducer body 40 has a shoulder portion 48 against which a clamping ring 49 is positioned. The clamping ring forces the transducer body 40 against the flange 32. Four bolt members 50 are threaded into tapped apertures 52 in the flange 36 to provide the means for securing the clamping ring which is clamped by nuts threaded on the bolts to clamp the body member 40 and hence, the diaphragm 45 through the sealing members to the mounting member 30. The inside gasket 46 acts as a spacer to provide for a pressure chamber 55 between the diaphragm 45 and the end of the transducer body 40 and permits the diaphragm to flex in this direction. The gasket configuration allows accidental leakage from the outside gasket 47 to pass between the mounting member and the transducer body to atmosphere without entering the pneumatic circuit or pressure chamber 55. Similarly, the inside gasket 46 seals the pressure chamber and any leakage therefrom would permit the air to escape around the transducer body without entering through the aperture 35 in the container. The transducer body includes a centrally located aperture 60 which has a partially threaded surface along its extent, indicated at 62. A nozzle member 70, having a nozzle tip 72 at one end of the same, has a threaded surface 73 along part of its extent with an inner bore or exhaust passage 74 extending therethrough and terminating in a tool receiving notch 75 at the end opposite the nozzle tip 72. The nozzle is positioned in the exhaust passage and a suitable "O" ring seal 80 is positioned in a groove 82 therein to seal the nozzle within the exhaust passage. It may be adjusted relative to the diaphragm 45 to the neutral position of the diaphragm to provide the near perfect one-to-one pressure correspondence between the air pressure and fluid pressure on either side of the diaphragm as will be hereinafter noted.

The transducer body 40 includes a pair of passages 85, and 86 therein which extend from the outer surface through to the pressure chamber 55. Suitable connector members 88 are connected at the ends of the same to permit the introduction of air under pressure to the pressure chamber and to sense the pressure of the pressure chamber 55. As will be hereinafter noted, the passage 85 will have air supply pressure applied thereto to apply pressure to the pressure chamber 55. The equilibrium pressure therein will be determined by the leakage through the exhaust nozzle 70 in the exhaust passage as controlled by the position of the diaphragm relative to the nozzle tip 72. The equilibrium pressure in the chamber 55 will be sensed at the port 86 in this embodiment. As will be seen in FIGS. 1 and 2, the transducer includes a two piece cover 90 with an adapter opening 92 in the same, the cover being held in position through suitable bolt or screw means 95 which thread into tapped apertures 96 in the clamping ring.

As shown diagramatically in FIG. 4, the improved pressure transducer 10 may be used to measure hydrostatic pressure within the container or pressure in a pipe or conduit. In FIG. 4, a tank or container 15 stores a liquid product, indicated generally at 20. The improved pressure transducer is designed to measure the hydrostatic pressure at or near the bottom of the container which pressure will be indicated on a manometer 25 or pressure gauge 26 which can be calibrated in terms of liquid level, product volume or product weight, as desired. The transducer is mounted on the wall of the container 15 at the opening 35 therein and compressed air from a source 100 is supplied through a constant differential pressure regulating valve 102 and through a restrictor or adjusting valve 103 to a pipe or conduit 104 leading to a passage 85 or 86 of the pressure transducer. The restrictor valve will cause a pressure drop of about 3 psi at a flow rate of about 1 cubic foot per hour. The pressure regulating valve 102 maintains the pressure drop constant regardless of back pressure on the line or pipe 104. This combination effects a constant rate of air flow under all conditions. Thus, the air flow through the pipe 104 is connected through one of the passages, preferably 85 in the transducer body to the pressure chamber 55 underneath the diaphragm 45. This air will exhaust through the nozzle 70 and the passage 74 therein and escape to atmosphere. The air pressure in the chamber 55 is also transmitted to the passage 86 which is connected through the tube 105 to the pressure gauge 26 or manometer 25.

The measuring action of the pressure transducer is such that the diaphragm 45 will flex inwardly with an increase in product pressure within the container 15. This will operate to close down on the nozzle tip 72 of the nozzle 70. However, the flow regulator 102 and 103 continues to pass air at a constant rate of flow. Thus, the pressure will build up in the chamber 55. It continues to rise until the force of the air pressure on the underside of the diaphragm 45 is sufficient to flex the diaphragm outwardly and permit air to escape through the nozzle 70 to atmosphere. The system will reach a state of equilibrium and the air pressure will remain constant within the pressure chamber until a change in hydrostatic pressure of the fluid within the container changes. Decreasing hydrostatic pressure, such as the cause by falling of the level of the fluid within the container acts in the reverse manner. The changes in pressure are substantially simultaneous and the two pressures, that of the liquid and the air in the pressure chamber are substantially equal at all times.

This particular transducer design is sanitary and particularly suited for the measurement of pressure in fluids where the contact surface must be capable of being cleaned in place, that is, without removal. Similarly, the mounting of the diaphragm is such that it is able to withstand reverse (vacuum) pressure. Thus, it is possible to apply full vacuum at one side of the diaphragm normally subjected to product pressure. This will cause the diaphragm to bulge outwardly but it will return to its normal position when the vacuum is removed. This is possible because the diaphragm is flat and is clamped at its perimeter with a great deal of pressure created by clamping of the gaskets through the screw action of the clamping ring and bolts. Similarly, the nozzle 70 is adjustable and contains a seal to prevent leakage around the nozzle. The position of the nozzle can be readily adjusted with respect to the diaphragm by rotating the nozzle with a screwdriver in the tool receiving slot 75 in the end of the same. This permits the exhaust nozzle to be positioned with respect to the diaphragm so that the when the diaphragm is in its neutral or relaxed position, the diaphragm is free from any self-induced spring forces. With the diaphragm in the neutral position, the correspondence between fluid pressure and air pressure is almost a perfect one-to-one. The improved pressure transducer has a wide range of pressure response and can be used up to its normal control limits of about 100 pounds per square inch with the lower end of the range being in the order of from 0 to 4 inches of water. Lower ranges than this may be affected by using thinner diaphragm material or using a larger size diaphragm.

The embodiment of FIGS. 5 and 6 differs from the preferred embodiment only in the number of passages in the transducer to the pressure chamber therein, the shape of the mounting member and a method of clamping the transducer body to the mounting member. Thus, in FIGS. 5 and 6, the mounting member 30 of the pressure transducer is secured to the wall of the pipe or container at an opening therein through suitable means, (not shown) such as welding or clamping. The inner flange portion 32 provides the support for mounting the diaphragm 45 with the sealing members 46 and 47 on either side of the same. The outer flange portion 36 of the mounting member has a threaded periphery 110. The transducer body 40 includes the tapped aperture 60 which mounts the nozzle 70 therein, the nozzle having a tip 72 and an exhaust passage 74 therethrough with the tool receiving opening 75 at the opposite end of the nozzle. The transducer body 40 has a first recess or flanged portion 115 and a second recessed flange portion 120. A clamping ring or nut 125 has a threaded interior surface 126 which couples with a threaded surface 110 at the outer flange 36 of the mounting member. A shoulder 128 on the clamping ring 125 bears against the shoulder 115 to clamp the transducer body as the clamping ring is threaded onto the mounting member. A plurality of tapped apertures 132 are positioned on the upper end of the clamping ring and suitable screw means 130 are threaded therein with washers 134 therebetween which bear against the shoulder 120 on the transducer body to aid in clamping the diaphragm 45 against the flange 32 of the mounting member. This embodiment includes a two piece cover 140 held in position with bolt members 142 threaded in tapped apertures in the upper surface of the transducer body. A suitable connector 145 is positioned in the wall of the cover 140 and serves to bring out tubular connections in the passages 85 and 74. Each have barbed type tube connections 146 and 147 therein by means of which tubular connections may be made thereto. In this embodiment, only a single passage is used with the supply passage 85. Air is supplied under pressure to the pressure chamber 55 beneath the diaphragm 45 and the position of the diaphragm relative to the nozzle will determine the leakage to the exhaust passage 74. The pressure buildup within the chamber 55 will reach an equilibrium establishing a pressure in the chamber and in the passage 85 which, as will be hereinafter noted, will provide a control pressure source.

FIG. 7 shows an application for the improved pressure transducer in a vacuum vessel level measurement system. Such systems are almost universally used to either concentrate or deaerate liquid products. In FIG. 7, a vessel indicated at 150, has a product input pipe or conduit 152 therein and a vacuum exhaust tube 155 at the top of the same. The suitable vacuum source is not shown. The product falls to a liquid level, indicated at 160, within the vessel and a pump 170 positioned at the base of the vessel is utilized for pumping the liquid product from the vessel and forcing it through an air operated throttle control valve 175 to discharge the same at a pipe 180. The object of such a system is to maintain the level of the liquid 160 within the chamber 150 at a constant level regardless of the change in product flow or the vacuum within the vessel. In such a system, the vacuum can be any negative air pressure up to a full vacuum. The water vapor and entrained gases are removed from the product and are drawn out from the exhaust pipe 155 by the vacuum source. A pressure transducer or sensor indicated herein at 185, is mounted in a low point in the vessel chamber to sense the product level through the hydrostatic pressure in the same. Compressed air from a source 190 is maintained at a constant flow rate of about 1 cubic foot per hour by a regulator 195 and a restrictor 196. Air flows through a tube 197 to the pressure transducer to be connected through the coupling 147 to the passage 85 therein as shown in FIGS. 5 and 6. Air is exhausted from the exhaust passage 74 to a pipe 198 which couples to the connector 146 at the transducer with the opposite end of the pipe being connected to the outlet 155 of the vessel 150 to exhaust to the vacuum source. The pressure in the line pipe 197 is a back pressure from the chamber 55 of the transducer and is connected through a "T" connection 199 in the line 197 through a pipe 200 and to a differential pressure sensing unit 205 on the high side thereof. The low side of the differential pressure sensing unit 205 is connected through a pipe 206 to the vessel 150. A pressure controller 210 balances a level set point against the movement or force of differential pressure sensor unit 205. Controller 210 is supplied from the high pressure air source 190 and produces a pneumatic signal output at the pipe 212 which is proportional to the difference of the set point and the differential pressure or the actual level of the liquid within the vessel 150. This signal is sent to the throttling valve 175 and causes it to increase or decrease product flow in order to maintain the level of liquid in the vessel 150 constant. The improved pressure transducer with the mounting of its diaphragm 45 allows the same to flex in both directions and the adjustment of the nozzle with respect to the diaphragm is such as to sense pressure differential at very low ranges. The application of the vacuum to the exhaust passage of the transducer and the reduction of pressure on the vessel side of the transducer provide an accurate indication of hydrostatic pressure of the fluid within the vessel and hence the level thereof regardless of the absolute pressure within the vessel.

Thus, the improved pressure transducer of both embodiments is particularly adapted for sensing of pressure in pipelines for indication or control, for level sensing in atmospheric vessels and for level control purposes, and for level sensing in vacuum vessels for level control purposes. The flat diaphragm which is preferably made of stainless steel or hardened plastic depending upon the application thereof is securely held between the gaskets to permit the application of high pressure thereon without damaging the diaphragm. The inner gasket is a spacer to provide the air chamber to permit the diaphram to flex. The gasket configuration minimizes the effects of accidental leakage from either the outside or inside gasket and assures that any leakage will not enter the pneumatic control system to effect the same. The adjustable nozzle allows the diaphragm to operate in its neutral position and results in a near perfect one-to-one pressure correspondence. The improved pressure transducer is particularly applicable to use in sanitary environments, such as in food and dairy processing, and the particular material configuration of the transducer is such that it may withstand cleaning at high temperature and pressure.

In considering this invention, it should be remembered that the present disclosure is illustrative only and the scope of the invention should be determined by the appended claims.

What I claim is:

1. A pressure transducer adapted to be mounted in the wall of a container having an opening therein for sensing pressure within the container, comprising, a mounting member for said transducer having a body portion adapted to be sealed to said container over the opening therein, said mounting member having an inner flange at one end thereof adjacent the container with an opening therein communicating with the opening in the container, an outer flange upon said mounting member at the other end thereof for mounting said transducer within said mounting member, said mounting member having a bore therethrough between said inner and outer flanges, a flat pressure sensitive diaphragm positioned in the mounting member, sealing members positioned on both sides of said diaphragm around the edges thereof, a transducer body positioned within the bore of the mounting member, means clamping said transducer body within said mounting member with said diaphragm positioned between said inner flange of said mounting member and an inner end of said transducer and with said sealing members sealing said diaphragm to said mounting member and said end of said transducer body to permit movement of the diaphragm toward and away from said transducer body and with said diaphragm exposed to the opening in said container, said diaphragm forming a pressure chamber with the end of said transducer body, an exhaust passage means positioned centrally through said transducer body communicating with said pressure chamber, an exhaust nozzle mounted in the said exhaust passage and adapted to be adjustably positioned axially therein relative to said diaphragm, additional passage means through said transducer body communicating with said pressure chamber adapted to be connected to a fluid pressure source for establishing a pressure within said chamber which is controlled by the position of said diaphragm relative to said exhaust passage nozzle and is equal to the fluid pressure within said container, said exhaust passage means being a tapped aperture through the transducer body with the exhaust nozzle having a threaded exterior surface and a centrally located aperture therein such that the exhaust nozzle may be threaded into the exhaust passage, means in the end of the exhaust nozzle remote from the diaphragm for adjusting the position of the exhaust nozzle axially in the exhaust passage, and means connected to exhaust passage means to remove exhaust air to a subatmospheric destination.

2. The pressure transducer of claim 1 in which the additional passage means through said transducer body is a single passage.

3. The pressure transducer of claim 1 in which the additional passage means through said transducer body is a pair of passages communicating with said pressure chamber with one of said passages being adapted to be connected to the fluid pressure source and the other of the passages being adapted to communicate the pressure of said chamber to a remote means.

4. The pressure transducer of claim 3 including a sealing member positioned on said exhaust nozzle and sealing said exhaust nozzle within said exhaust passage means, and in which said means in the end of the exhaust nozzle is a tool receiving notch for adjustably positioning the same relative to the diaphragm.

5. The pressure transducer of claim 1 in which said clamping means includes a flange portion on the transducer body and means clamping said outer flange on said mounting member to said flange portion to clamp said transducer body to the mounting member with the diaphragm and said sealing members therebetween.

6. The pressure transducer of claim 1 in which said clamping means includes a clamping ring bearing against said transducer body and coupling means connecting said clamping ring to said outer flange on said mounting member to clamp said transducer body to said mounting member.

7. The pressure transducer of claim 1 in which the flat pressure sensitive diaphragm is a metallic disc.

8. The pressure transducer of claim 1 in which the flat pressure sensitive diaphragm is a non-metallic disc.

* * * * *